United States Patent
Kondo (10) Patent No.: US 11,697,232 B2
(45) Date of Patent: Jul. 11, 2023

(54) METAL RESIN COMPOSITE-MOLDED ARTICLE AND METHOD FOR MANUFACTURING SAME

(71) Applicants: Polyplastics Co., LTD., Tokyo (JP); Yamase Electric Co., LTD., Miyagi (JP)

(72) Inventor: Hidemi Kondo, Shizuoka (JP)

(73) Assignees: Polyplastics Co., Ltd., Tokyo (JP); Yamase Electric Co., Ltd., Miyagi (JP)

( * ) Notice: Subject to any disclaimer, the term of this patent is extended or adjusted under 35 U.S.C. 154(b) by 0 days.

(21) Appl. No.: 16/632,257

(22) PCT Filed: Jul. 19, 2018

(86) PCT No.: PCT/JP2018/027081
§ 371 (c)(1),
(2) Date: Jan. 17, 2020

(87) PCT Pub. No.: WO2019/017428
PCT Pub. Date: Jan. 24, 2019

(65) Prior Publication Data
US 2020/0223113 A1    Jul. 16, 2020

(30) Foreign Application Priority Data
Jul. 20, 2017    (JP) .................................. 2017-140649

(51) Int. Cl.
*B29C 45/14*    (2006.01)
*B32B 15/08*    (2006.01)
(Continued)

(52) U.S. Cl.
CPC ........ *B29C 45/14311* (2013.01); *B32B 15/08* (2013.01); *B23K 26/364* (2015.10);
(Continued)

(58) Field of Classification Search
CPC ......... B29C 45/14311; B29C 45/14811; B29C 37/0082; B29C 2045/14868; B29C 45/14;
(Continued)

(56) References Cited

U.S. PATENT DOCUMENTS

2013/0249145 A1    9/2013    Okumura et al.
2018/0085977 A1    3/2018    Ezaki

FOREIGN PATENT DOCUMENTS

JP    2014-004802 A    1/2014
JP    2014-117724 A    6/2014
(Continued)

OTHER PUBLICATIONS

Machine Translation of JP 2014-004802(A). (Year: 2014).*
Extended Search Report in European Patent Application No. 18835735. 4, dated Sep. 28, 2020.

*Primary Examiner* — Brian Handville
(74) *Attorney, Agent, or Firm* — Knobbe, Martens, Olson & Bear, LLP (57) ABSTRACT

A metal resin composite-molded article which can suppress deformation induced by laser processing in a technique for improving the adhesion between a metal plate and a resin by forming grooves on the surface of the metal plate by means of a laser, even if the metal plate is thin. A metal resin composite-molded article obtained by insert-molding a resin composition on a metal plate having a thickness of 500 μm or less, grooves are formed on the surface of the metal plate in which the resin composition is inserted, the width of the grooves is 30-300 μm, the depth of the grooves is at most 24% of the thickness of the metal plate, and the ratio of the width to the depth is 0.1-2.5.

1 Claim, 5 Drawing Sheets

(51) Int. Cl.
    *B23K 26/364*    (2014.01)
    *B29K 705/02*    (2006.01)
    *B32B 15/20*     (2006.01)

(52) U.S. Cl.
    CPC ..... *B29C 45/14811* (2013.01); *B29K 2705/02* (2013.01); *B32B 15/20* (2013.01)

(58) Field of Classification Search
    CPC ....... B32B 15/08; B32B 15/20; B23K 26/364; B29K 2705/02; B29K 2705/12; B29K 2705/10
    See application file for complete search history.

(56)             References Cited

FOREIGN PATENT DOCUMENTS

JP      2014-133407 A     7/2014
    JP      2014-223781 A    12/2014
    JP      2016-093996 A     5/2016
    WO    WO 2016/194361 A1  12/2016

* cited by examiner

METAL RESIN COMPOSITE-MOLDED ARTICLE AND METHOD FOR MANUFACTURING SAME

This application is the U.S. National Phase under 35 U.S.C. § 371 of International Application PCT/JP2018/027081, filed Jul. 19, 2018, designating the U.S., and published in Japanese as WO 2019/017428 on Jan. 24, 2019, which claims priority to Japanese Patent Application No. 2017-140649, filed Jul. 20, 2017, the entire content of which is incorporated herein by reference.

TECHNICAL FIELD

The present invention relates to a method of manufacturing a metal plate to be bonded to a resin, and a metal resin composite molded article including the metal plate produced by the method and a resin.

BACKGROUND ART

A metal resin composite molded article in which a metal plate comprising metal, a metal alloy, or the like and a resin molded article comprising a thermoplastic resin composition are combined has been conventionally used for interior material for automobiles such as console boxes around instrument panels, components around engines, interior parts, housings for electronic devices such as digital cameras and mobile phones, and components contacting the external world such as interface connecting parts, power supply terminals, and the like.

Examples of methods of combining a metal plate and a resin molded article include a method of forming minute unevenness on a bonding surface on the metal plate side and bonding by an anchoring effect, a method of bonding using adhesive or double-sided tapes, a method of providing a fixing member such as a folded piece or a claw on the metal plate and/or resin molded article and fixing them using this fixing member and a method of bonding using a screw or the like. Among these methods, the method of forming minute unevenness on a metal plate or the method of using adhesive is effective in respect of a degree of freedom of shape for designing the metal resin composite molded article.

In particular, the method of processing a surface of a metal plate to form minute unevenness is advantageous in that expensive adhesive is not used and a step of applying adhesive and curing the adhesive is unnecessary. As the method of forming minute unevenness by processing a surface of a metal plate, for example, a method disclosed in Patent Document 1 can be cited.

Patent Document 1: Japanese Unexamined Patent Application, Publication No. 2014-117724

DISCLOSURE OF THE INVENTION

Problems to be Solved by the Invention

The method described in Patent Document 1 is one of the effective methods, because a groove can be formed in a desired area on a surface due to the groove being formed on the surface of a metal plate with a laser, and operation is simple.

Incidentally, when a metal plate is subjected to laser processing, local heat is generated at the processing point of the metal plate, and deformation due to thermal expansion of the metal plate may occur. Such deformation can be suppressed to some extent if the metal plate has low thermal expansion or the metal plate is in a form that allows heat to easily diffuse. However, if the thickness of the metal plate is less than 500 μm, it is difficult to secure structural strength due to rigidity of the metal plate itself, and therefore this deformation is too large to neglect. In metal plates requiring a thin shape, such as housings for recent smart phones, it has been a problem to suppress this deformation. In addition, in a case in which a metal is rolled into a roll-like shape and used as in an insert terminal of hoop molding, an overly thick metal plate cannot be rolled into a roll-like shape. Even if the metal plate can be rolled, forcible rolling of a thick metal plate causes load applied to the metal plate to remain as an internal strain, resulting in reduction in strength or deformation of the metal plate, which reduces bonding strength or hermeticity of the insert molded product. Due to these problems, in such an application, a thin metal plate having a thickness of about 500 μm or less is required from the viewpoint of rolling potentiality. Thus, it has been a problem to suppress deformation of such a thin metal plate during laser processing.

An object of the present invention is to provide a technique for improving adhesion between a metal plate and a resin by forming a groove on a surface of the metal plate with a laser, with the technique being able to provide a metal resin composite molded article in which deformation of the metal plate is suppressed due to laser processing even when the metal plate becomes thin.

Means for Solving the Problems

The object of the present invention has been achieved by the following. A first aspect of the present invention is a metal resin composite molded article, in which a resin composition is insert molded to a metal plate, in which the metal plate has a thickness H of 500 μm or less, in which a groove is formed on a surface of the metal plate, onto the surface of which the resin composition is to be inserted, and in which a width Y of the groove is 30 to 300 μm, a depth X of the groove is 24% or less of the thickness H of the metal plate, and a ratio of the depth X to the width Y, X/Y, is 0.1 to 2.5.

A second aspect of the invention is a method for producing a metal resin composite molded article, the method comprising insert molding a resin composition to a metal plate having a thickness H of 500 μm or less, in which the method comprises a step of forming on a surface of the metal plate a groove, to which the resin composition is inserted, and in which a width Y of the groove is 30 to 300 μm, a depth X of the groove is 24% or less of the thickness H of the metal plate, and a ratio of the depth X to the width Y, X/Y, is 0.1 to 2.5.

Effects of the Invention

In the metal resin composite molded article of the present invention, deformation by laser processing is suppressed, even when the metal plate is a thin film.

BRIEF DESCRIPTION OF THE DRAWINGS

FIG. 3(a) is a top view, in which the metal plate processing is applied to the back surface.

FIG. 3(b) is an exploded perspective view, in which the metal plate processing is applied in the lower part.

FIG. 3(c) is a cross-sectional view of A-A'.

PREFERRED MODE FOR CARRYING OUT THE INVENTION

Embodiments of the present invention are described below. It should be noted that the present invention is not limited to the following embodiments.

Metal Resin Composite Molded Article

The inventive metal resin composite molded article is a metal resin composite molded article in which a resin composition is insert molded to a metal plate, and characterized in that: the metal plate has a thickness H of 500 μm or less, a groove is formed on a surface of the metal plate, onto the surface of which the resin composition is to be inserted, and a width Y of the groove is 30 to 300 μm, a depth X of the groove is 24% or less of the thickness H of the metal plate, and a ratio of the depth X to the width Y, X/Y, is 0.1 to 2.5.

Metal Plate

Examples of the metal plate used in the present invention include aluminum, magnesium, stainless steel, copper, and titanium, etc. The metal plate may comprise a metal alloy. The surface of metal material may be subjected to surface treatment such as anodic oxidation or painting. From the viewpoint of lightness and strength, aluminum, magnesium, copper, and titanium are preferable. In applications requiring conductivity, such as a terminal, aluminum and copper are more preferable, and copper is the most preferable. In applications requiring thin-walled rigidity, such as a portable terminal housing, magnesium and titanium are preferable, and titanium is the most preferable. The present invention is useful when the thickness H of the metal plate is 500 μm or less. The lower limit of the thickness H of metal film is preferably 100 μm or more in terms of strength.

Groove Shape

In the present invention, a groove formed on the surface of the metal plate is formed such that the width Y is 30 μm to 300 μm, the depth X is 24% or less of the thickness H of the metal plate, and the ratio X/Y of the depth X to the width Y is 0.1 to 2.5.

If the thickness H of a metal plate exceeds 500 μm, a depth of a groove and bonding strength are almost correlated with each other and a desired bonding strength can be obtained by increasing the depth of a groove. If the thickness H of the metal plate is 500 μm or less, first of all, the metal plate is easily deformed when forming a groove due to thinness. If a depth of the groove is deep, the metal plate is further thinner in the groove portion, so that a sufficient depth of the groove may not be ensured while maintaining the strength of the metal plate in some cases. Thus, a technical means for securing a satisfactory bonding strength, other than a depth, has been necessary. The inventors have found that adjustment of a shape of a groove achieves this need.

As a depth X and a width Y of a groove of the present invention, values measured using a laser microscope are adopted. Additionally, when portions irradiated with a laser intersect with each other, the depth is measured by the above-described method for a portion other than the intersection portion.

In the present invention, the width Y is 30 to 300 μm, and is preferably 50 to 200 μm in terms of the balance between the deformation and the bonding strength.

It is difficult to suppress deformation, unless the depth X is 24% or less of the thickness H of the metal plate. In order to obtain the bonding strength while suppressing deformation more satisfactorily, the depth X is preferably 5 to 23% of the thickness H of the metal plate. X is preferably 20 to 100 μm.

The ratio X/Y of the depth X to the width Y needs to be 0.1 to 2.5 in terms of the balance between deformation and bonding strength. It is preferably from 0.2 to 2, more preferably from 0.25 to 1.

Method of forming Grooves

Figure 1:
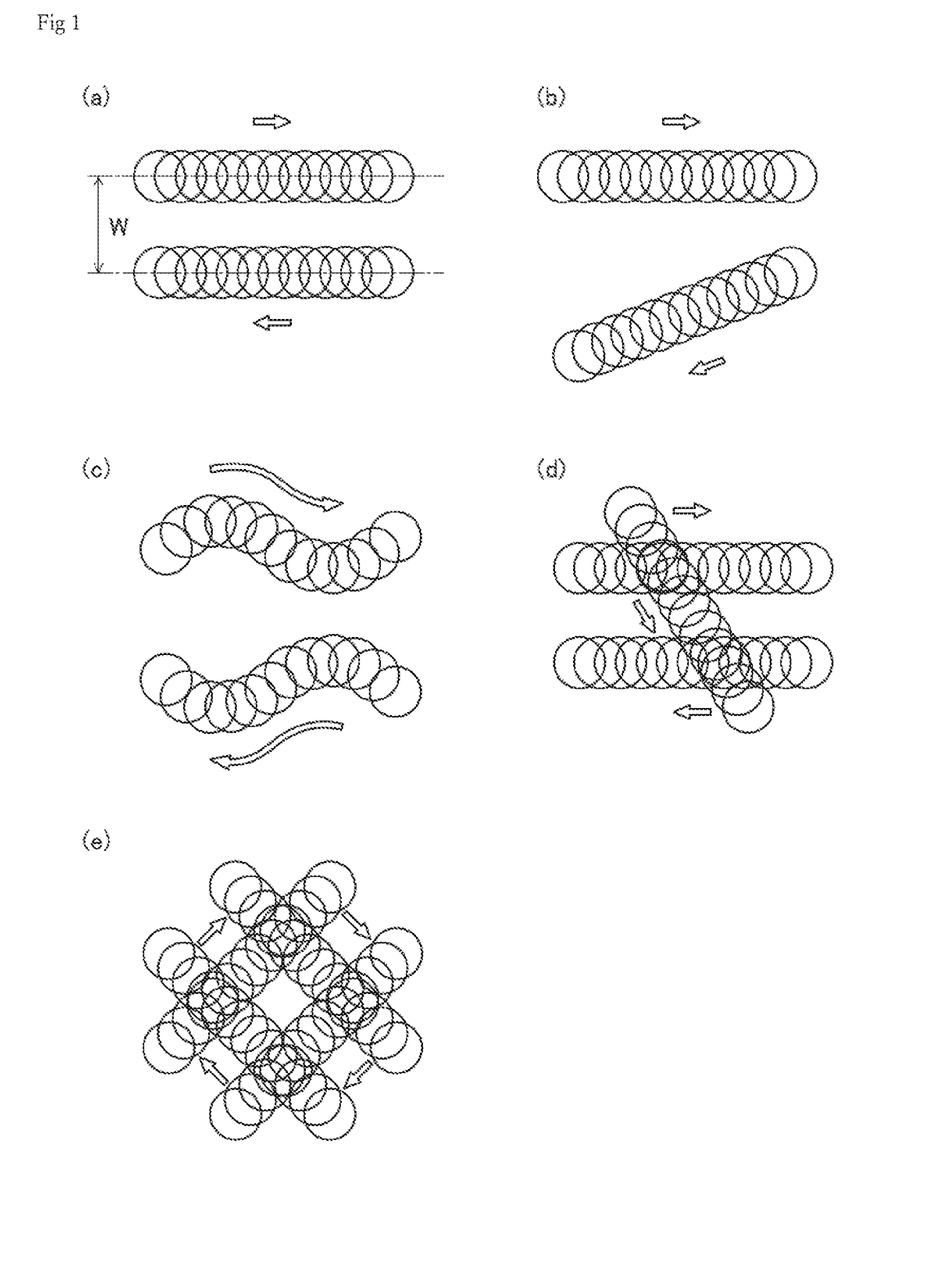
FIG. 1 is a drawing showing examples of laser radiation patterns to a surface of metal.

The groove according to the invention is formed by a laser. More specifically, grooves are formed under the condition that the surface of the metal is irradiated with a laser, so as to be grooved, melted and re-solidified. With reference to a case that a laser beam of a pulse wave is radiated, the present invention is specifically explained below. FIG. 1 is a drawing showing examples of laser beam radiation patterns to a surface of metal. Grooves are formed in the portions irradiated with a laser on the surface of the metal. White arrows in FIG. 1 indicate the scanning direction of the laser.

FIG. 1(a) is a drawing showing a laser radiation method for forming the grooves in a line. In the case of the radiation method shown in FIG. 1(a), two grooves run substantially in parallel. The distance between the centers of the pulses in the direction in which the grooves run is an interval between adjacent grooves (in the present specification, the interval between adjacent grooves may be referred to as a "hatching width" W). In the case shown in FIG. 1(a), the hatching width is constant, and in the present invention, it is preferable to adjust the hatching width so as to be in the range of 0.1 to 5.0 times the width Y of the groove.

A hatching width smaller than the above range renders a width of the metal portion between the grooves narrower, resulting in a decrease in the strength of this portion, which may be disadvantageous in terms of bonding strength and hermeticity. A hatching width greater than the above range renders an interval between the grooves wider, resulting in a decrease in the number of grooves that can be provided within the same processing area, so that the bonding strength and the hermeticity may be lowered.

Note that it is not necessary to radiate a laser beam substantially in parallel, as shown in FIG. 1(b). In the case shown in FIG. 1(b), although the hatching width is not constant, it is preferable that the hatching width is at least partially in the range of 0.1 to 5.0 times the width Y of the groove. Further, as shown in FIG. 1(c), the laser beam may not be linearly radiated.

The number of grooves is not particularly limited. When the number of grooves is 3 or more, it is preferable that at least a part of the hatching widths between adjacent grooves is in the range of 0.1 to 5.0 times the width Y of the groove. If the grooves are formed in a line as described above, a plurality of grooves may intersect each other as shown in FIG. 1(d).

As described above, a surface of a metal plate is irradiated with a laser beam, but a more preferable radiation method for improving strength of a bonding portion is a method in which a laser beam is radiated so that grooves formed in a line in a predetermined direction and grooves formed in a line in a direction different from the predetermined direction intersect each other, as shown in FIG. 1(e). The most preferable radiation method is a radiation method in which the angle of the intersection is approximately 90°.

Figure 2:
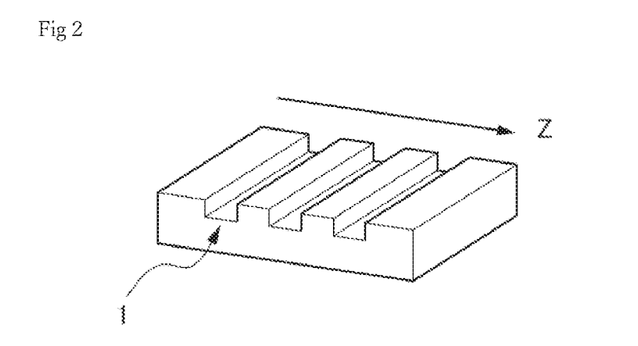
FIG. 2 is a drawing showing a direction Z of securing hermeticity in a molded article for a hermeticity test.

In the present invention, a more preferable radiation method for improving hermeticity of a bonding portion is, as shown in FIG. 2, a method in which a laser beam is radiated so that the groove blocks the direction Z in which the hermeticity is desired to be established. The most preferable radiation method is a method in which a laser beam is radiated so that a plurality of grooves is formed substantially perpendicularly with respect to the direction in which the hermeticity is desired to be established and the grooves are not connected to each other. Further, the spot diameter of the laser beam (when a radiation range of the laser beam is a circle as shown in FIG. 1, the diameter of the circle representing the radiation range) is preferably 300 μm or less, more preferably 30 to 100 μm.

The laser radiation method in the present invention includes a method in which a position once irradiated with a laser beam is irradiated doubly or triply (adjustment of the number of times of scanning), the spot diameter of the laser beam is adjusted, the output of the laser beam is adjusted, the frequency of the laser beam is adjusted, or the scanning speed of the laser beam is adjusted. Specific conditions differ according to the type and the like of metal material constituting the metal plate, and therefore, preferable conditions are appropriately adopted according to the type or the like of the metal material.

A metal plate formed into a desired shape is used according to the application or the like. For example, molten metal or the like is poured into a mold having a desired shape, whereby a metal plate having a desired shape can be obtained. Further, in order to form a metal plate into a desired shape, cutting processing by a machine tool, etc. may be used, for example.

In particular, a thin metal plate as in the present invention is sometimes supplied to hoop molding in a rolled state. In such a case, a groove may be formed by radiating a laser beam to a metal plate in a halfway stage from the rolled metal plate to the molding machine. Alternatively, a metal plate is irradiated with a laser beam in advance, and the grooved metal plate may be taken up into a rolled state. On the surface of the metal plate obtained as described above, a groove is formed using a laser. The position at which the groove is formed and the size of the range of the groove are determined in consideration of the position, etc. at which the resin is formed.

Resin Composition

The resin composition used in the present invention is not particularly limited, and a thermoplastic composition containing a conventionally known thermoplastic resin can be used.

Examples of thermoplastic resins include polyethylene (PE), polypropylene (PP), polystyrene (PS), an acrylonitrile/styrene resin (AS), an acrylonitrile/butadiene/styrene resin (ABS), a methacrylic resin (PMMA) and vinyl chloride (PVC). Examples of thermoplastic resins (general-purpose engineering resins) include polyamide (PA), polyacetal (POM), ultra-high molecular weight polyethylene (UHPE), polybutylene terephthalate (PBT), GF-reinforced polyethylene terephthalate (GF-PET), polymethylpentene (TPX), polycarbonate (PC) and modified polyphenylene ether (PPE). Examples of thermoplastic resins (super engineering resins) include polyphenylene sulfide (PPS), polyether ether ketones (PEEK), liquid-crystalline resins (LCP), polytetrafluoroethylene (PTFE), polyetherimide (PEI), polyarylate (PAR), polysulfone (PSF), polyether sulfone (PES) and polyamide imide (PAI). Examples of thermosetting resins include phenolic resins, urea resins, melamine resins, unsaturated polyesters, alkyd resins, epoxy resins and diallyl phthalate. Examples of elastomers include thermoplastic elastomers and rubbers, such as styrene-butadiene based elastomers, polyolefin-based elastomers, urethane based elastomers, polyester based elastomers, polyamide based elastomers, 1,2-polybutadiene, polyvinyl chloride based elastomers and ionomers. Further, a thermoplastic resin to which a glass fiber is added, a polymer alloy, or the like may be exemplified.

In addition, additives such as an inorganic filler typified by glass fiber, an organic filler, a flame retardant, an ultraviolet ray absorber, a thermal stabilizer, a photostabilizer, a coloring agent, a mold releasing agent, a plasticizer, and the like may be added within a range that does not significantly impair the effects of the present invention, in order to impart desired physical properties.

Among the thermoplastic resin compositions, in order to obtain better adhesion, it is preferable to use a thermoplastic resin composition having a melt viscosity of 500 Pa·s or less at a shear rate of 1000/sec, measured at a temperature at or between the melting point of the thermoplastic resin+20° C. and the melting point of the thermoplastic resin+30° C.

In view of the above, polyacetals (POM), polybutylene terephthalate (PBT), polyethylene terephthalate (PET), polyphenylene sulfide (PPS), polyether ether ketone (PEEK), liquid crystal resins (LCP) and the like are preferable thermoplastic resins, and in particular, polybutylene terephthalate (PBT), polyethylene terephthalate (PET), polyphenylene sulfide (PPS), and liquid crystal resins (LCP) are preferably used.

Method for Producing Metal Resin Composite Molded Article

The metal resin composite molded article of the present invention includes a metal plate and a resin composition formed on at least a part of the surface of the metal plate. Concrete steps of the method for producing the metal resin composite molded article are not particularly limited and any step by which a molten thermoplastic resin composition is introduced into unevenness the groove, so that the resin and the metal plate are combined together is acceptable.

Examples include a method in which a grooved metal plate is placed in an injection molding mold, and a molten thermoplastic resin composition is injected into the injection molding mold to produce the metal resin composite molded article of the resin and the metal plate. Conditions for injection molding are not particularly limited, and preferable conditions can be set as appropriate according to the physical properties, etc. of the thermoplastic resin composition. In addition, a method using transfer molding, compression molding, or the like is also an effective method for forming the metal resin composite molded article in which the resin and the metal plate are combined.

Another example is a method in which a resin is molded in advance by a common molding method such as an injection molding method, and a grooved metal plate and the resin are brought into contact with each other at a desired bonding position, and heat is applied to the contact surface, whereby the vicinity of the contact surface of the resin is melted, thereby the metal resin composite molded article of the resin and the metal plate is produced.

Characteristics of Metal Resin Composite Molded Article

As described above, the metal resin composite molded article of the present invention is excellent in adhesiveness between the resin and the thin-walled metal plate as well as in long-term durability, so that the adhesiveness stably lasts for a long period of time even under a high temperature environment or a low temperature environment. Thus, the metal resin composite molded article of the present invention can be suitably used for application in which excellent adhesiveness is stably required for a long period of time under a high temperature environment. For example, the present metal resin composite molded article can be used in a heat radiating structure that includes a conductive heat generating portion, an insulating portion, and a conductive heat radiating portion, and that transfers heat from the conductive heat generating portion to the conductive heat radiating portion via the insulating portion and radiates the heat.

Here, the resin and the metal plate in the inventive metal resin composite molded article correspond to the insulating portion and the conductive heat radiating portion in the heat radiating structure, respectively, and examples of the conductive heat generating portion include electronic components and the like. In particular, the inventive metal resin composite molded article includes a thin metal plate, and thus can be efficiently produced by hoop-molding in which the metal plate is supplied as a roll. In this respect, the inventive metal resin composite molded article can be suitably used in electronic components requiring hermeticity or terminal holding structures thereof.

More specifically, the inventive metal resin composite molded article is useful as a part of a heat radiating structure in an electric or electronic device having a conductive heat generating portion housed in a housing having a resin-made boss, a holding member, and the like inside the electric or electronic device. Here, examples of electric or electronic devices include portable video electronic devices, such as a cell phone, a camera, an all-in-one video camera, a digital camera or the like; portable information or communication terminals, such as a lap top personal computer, a pocket computer, a calculator, an electronic notebook, a PDC, a PHS, a cell phone or the like; portable acoustic electronic devices, such as an MD, a cassette headphone stereo, a radio or the like; and household electric appliances, such as a liquid crystal TV or monitor, a phone, a facsimile, a hand scanner or the like. Examples of electronic components requiring hermeticity include a connector, a sensor, a capacitor, a battery, an LED package or the like.

EXAMPLES

In the following, the Examples and the Comparative Examples are described to concretely explain the invention, but the present invention is not limited to these Examples.

Production Method of Insert Molded Body

Figure 3:
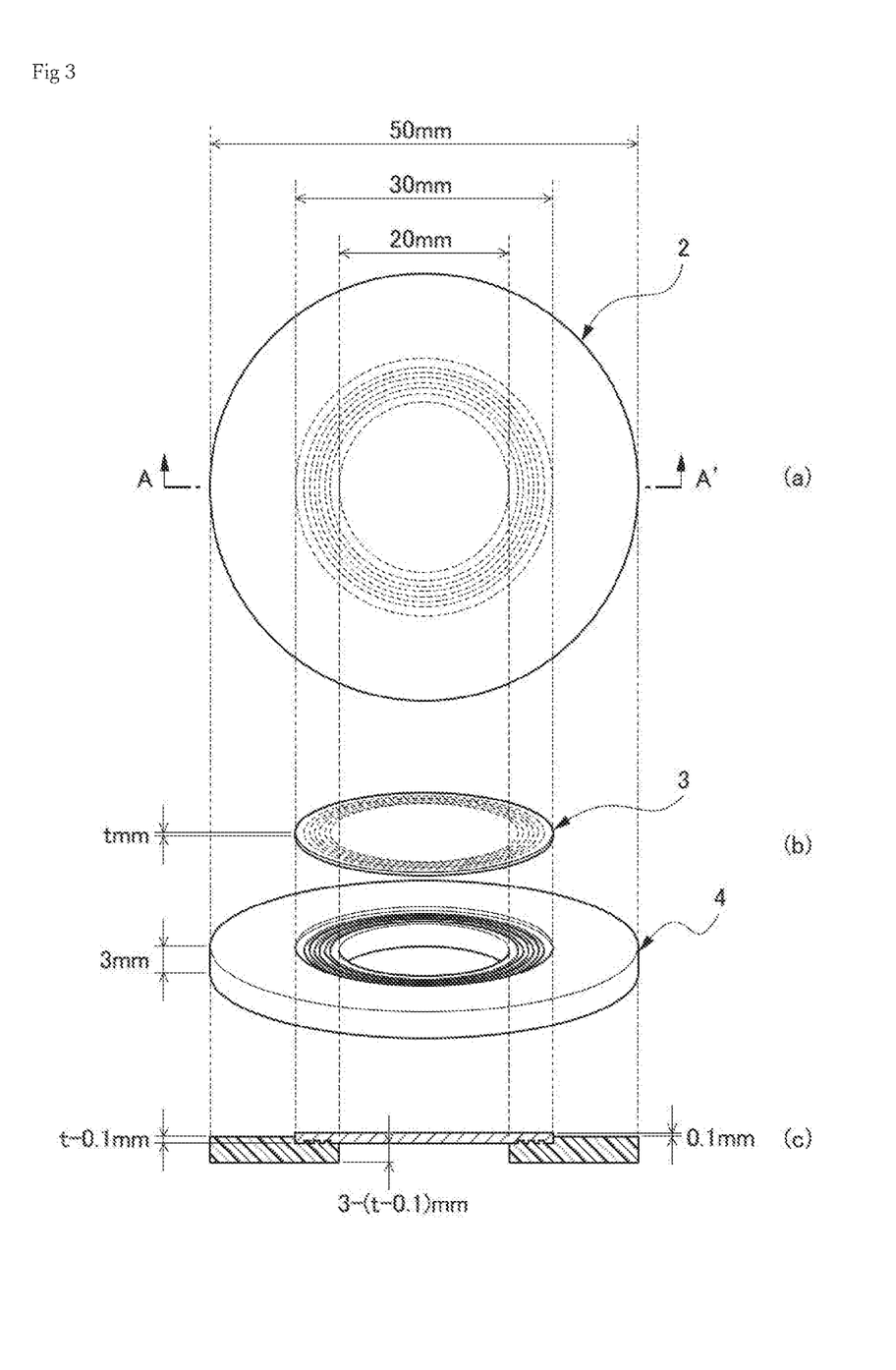
FIG. 3 is a schematic drawing showing a test piece of the metal resin composite molded article used in the Examples and the Comparative Examples (insert molded body with a thickness t of the metal plate).

A schematic diagram of the metal resin composite molded article (insert molded body) used in the Examples and the Comparative examples is shown in FIG. 3. FIG. 3(a) is a top view, FIG. 3(b) is a perspective view, and FIG. 3 (c) is a cross-sectional view. The upper part of FIG. 3(b) is a drawing showing a metal plate, and the lower part is a drawing showing an inserted resin. This insert molded body was produced by the following method. The unit of dimension in the drawings is mm.

As a thermoplastic resin composition constituting the resin portion, a polyphenylene sulfide-based resin composition ("Durafide®1135ML1" manufactured by Polyplastics Co. Ltd., which is a resin composition containing 35% by mass of glass fiber as a filler and having a melt viscosity of 260 Pa·s at a shear rate of 1000/sec measured at 310° C.) was used.

Melt Viscosity

Using a capilograph manufactured by Toyo Seiki Seisaku-sho, Ltd., a 1 mm φ×20 mm L/flat die was used as a capillary, and the melt viscosity was measured at a predetermined barrel temperature and a shear rate of 1000/sec. The barrel temperature was set at 310° C.

As the metal plate, disk-shaped bodies made of copper (C1100P, thicknesses H are indicated in the table) and having an outer diameter of 30 mm φ, in which grooves were formed as described below, were used. Each of these metal plates had a surface to be bonded near the groove portion in FIG. 3(a), specifically, in a region which is 20 mm φ outside from the center portion of the disk, that is, in a region of a 5 mm width on the outer peripheral side of the disk of 30 mm φ.

Groove Formation

Using a laser marker MD-V 9900 (manufactured by Keyence Corporation, laser type: $YVO_4$ laser, emission wavelength: 1064 nm, maximum rated output power: 13 W (average)), grooves were formed on the metal surface to be bonded at an output of 90%, a frequency of 40 kHz, and a scanning rate of 1000 mm/s, so as to be concentric as illustrated in FIG. 3(b) with a depth and a width shown in Tables 1 and 2. The spot diameter of the laser beam and the number of times of scanning were appropriately adjusted according to the depth and width of the groove. For example, in the case of a width of 50 μm and a depth of 70 μm, the spot diameter was adjusted to 50 μm, and the number of times of scanning was set to 300. Here, the number of grooves was set so that with regard to the area of the region (the surface to be bonded) in which the resin and metal contact each other in the test piece in FIG. 3, projected areas of concave portions and convex portions, which formed unevenness of the grooves, were equal to each other, namely, the of each of the concave portions was equal to the width of each of the convex portions (the hatching width was twice the width Y of the groove). Namely, the number of grooves formed in a region with a width of 5 mm between a radius of 15 mm of the outer periphery (diameter: 30 mm) of a region where the resin and metal are in contact with each other and a radius of 10 mm of the inner periphery (diameter: 20 mm) thereof was approximately 5 mm/(width Y×2).

In addition, the depth X and the width Y of unevenness forming the grooves were measured using a laser microscope ("VK-9510" manufactured by Keyence Co. Ltd.). The measurement results of the depth X, the width Y, and the ratio X/Y are shown in Tables 1 and 2.

Each of these metal plates was placed in a mold, and the combining step was performed. Molding conditions were as follows. The shape of the metal resin composite molded article is as shown in FIG. 3.

Molding Conditions

Molding machine: Sodick TR-40VR (vertical type injection molding machine)
Cylinder temperature: 320° C.
Mold temperature: 150° C.
Injection speed: 100 mm/s
Holding pressure: 49 MPa×5 seconds Evaluation With respect to the metal resin composite molded articles produced by the above method, the bonding strength of the bonding portion and the fracture form after peeling were evaluated. Specific evaluation methods are as follows.

Deformation

Metal plates after laser radiation were visually observed, and those in which significant deformation such as warpage was observed were evaluated as X, and those that were not so were evaluated as O. The results are shown in Tables 1 and 2.

Bonding Property (Hermeticity)

Figure 4:
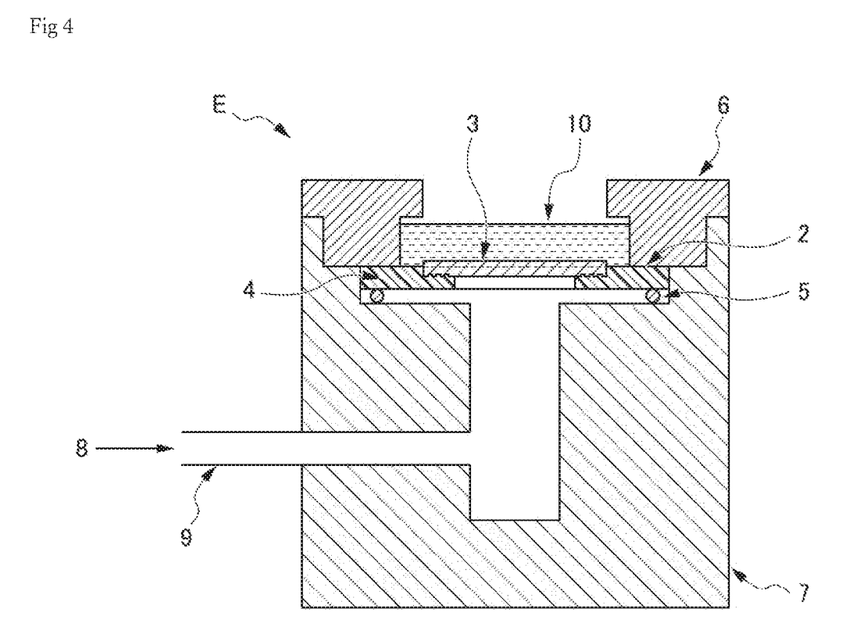
FIG. 4 is a drawing showing a hermetic tester E used in the Examples to test hermeticity between the resin portion and the metal plate.

With regard to the evaluation of bonding property, the hermeticity of a metal resin composite molded body 5 produced by the above method was measured by the following method. FIG. 4 is a vertical cross-sectional view showing a method of evaluating hermeticity using a hermeticity tester E. The hermeticity tester E included a hermeticity tester main body 7 and a hermeticity tester lid 6. A metal resin composite molded body test piece 2 was attached to the hermetic tester main body 7 via an O-ring 5, and the lower portion of the metal resin composite molded body test piece 2 was sealed. Thereafter, the hermeticity tester lid 6 was placed on a resin member 4 of the metal resin composite molded body test piece 2 and was clamped.

Distilled water 10 was poured onto the metal resin composite molded body test piece 2, and the metal resin composite molded body test piece 2 was completely immersed in the distilled water 10. Air was fed through a line 9, and a pressure of 0.1 MPa was applied to an inside of the hermeticity tester main body 7 for six minutes, and it was visually observed whether or not air bubbles leaked from the interface between the metal plate 3 and the resin member 4. The above test was performed three times, and the evaluation results of the hermeticity according to the following criteria are shown in Tables 1 and 2.

O: When air bubbles were not confirmed to leak even once, the hermeticity was evaluated to be good.

Δ: When air bubbles were confirmed to leak once or twice, the hermeticity was evaluated to be moderate.

X: When air bubbles were confirmed to leak three times, the hermeticity was evaluated to be bad.

Taking up Property

On the basis of assumption that metal plates are used in hoop molding, the metal plates each having any thickness used in the Examples or the Comparative Examples were cut into a plate shape of 20 mm×50 mm in a state prior to laser radiation. Each of the obtained plates was wound around a cylinder having a curvature radius of 40 mm with the longitudinal direction being placed in the circumferential direction, held for 10 seconds, and then laid on a surface table so that a surface having faced the outside during holding would face downward, and the occurrence of warpage due to distortion was visually confirmed.

With regard to metal plates in which warpage was observed, rolling would be difficult because it is considered that excessive force is required when the metal plate is rolled into a rolled shape, or distortion may decrease strength or may result in deformation. Therefore, the metal plate with which significant warpage was observed was evaluated as X and the metal plate which was not so was evaluated as O. The results are shown in Tables 1 and 2.

TABLE 1

| | Example | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Plate thickness(μm) | 400 | 400 | 400 | 400 | 400 | 400 | 400 | 400 | 400 | 400 | 400 | 400 | 400 | 150 | 200 | 300 | 400 | 450 |
| Groove depth(μm) | 40 | 40 | 40 | 40 | 40 | 80 | 80 | 80 | 80 | 80 | 80 | 90 | 95 | 20 | 20 | 30 | 20 | 50 |
| Groove depth/ Plate thickness(%) | 10.0 | 10.0 | 10.0 | 10.0 | 10.0 | 20.0 | 20.0 | 20.0 | 20.0 | 20.0 | 20.0 | 22.5 | 23.8 | 13.3 | 10.0 | 10.0 | 5.0 | 11.1 |
| Groove width(μm) | 40 | 50 | 100 | 200 | 300 | 35 | 40 | 50 | 100 | 200 | 300 | 100 | 100 | 50 | 50 | 65 | 200 | 120 |
| Groove depth/ Groove width | 1.00 | 0.80 | 0.40 | 0.20 | 0.13 | 2.29 | 2.00 | 1.60 | 0.80 | 0.40 | 0.27 | 0.90 | 0.95 | 0.40 | 0.40 | 0.46 | 0.10 | 0.42 |
| Deformation | O | O | O | O | O | O | O | O | O | O | O | Δ | Δ | O | O | O | ⊚ | ⊚ |
| Bonding property (hermeticity) | Δ | O | ⊚ | O | Δ | Δ | O | ⊚ | ⊚ | O | Δ | ⊚ | ⊚ | Δ | Δ | ⊚ | Δ | O |
| Rolling property | O | O | O | O | O | O | O | O | O | O | O | O | O | O | O | O | O | O |

TABLE 2

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Plate thickness(μm) | 2000 | 400 | 400 | 400 | 400 | 400 | 400 | 400 | 200 | 100 | 550 | 550 | 550 | 550 | 550 |
| Groove depth (μm) | 40 | 150 | 40 | 40 | 80 | 80 | 100 | 100 | 70 | 40 | 40 | 70 | 100 | 100 | 150 |

TABLE 2-continued

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Groove depth/Pate thickness(%) | 2.0 | 37.5 | 10.0 | 10.0 | 20.0 | 20.0 | 25.0 | 25.0 | 35.0 | 40.0 | 7.3 | 12.7 | 18.2 | 18.2 | 27.3 |
| Groove width(μm) | 70 | 50 | 25 | 450 | 30 | 400 | 50 | 100 | 40 | 50 | 50 | 40 | 100 | 50 | 50 |
| Groove depth/Groove width | 0.57 | 3.00 | 1.60 | 0.09 | 2.67 | 0.20 | 2.00 | 1.00 | 1.75 | 0.80 | 0.80 | 1.75 | 1.00 | 2.00 | 3.00 |
| Deformation | ○ | X | ○ | ○ | ○ | ○ | X | X | X | X | ◎ | ○ | ○ | ○ | X |
| Bonding property (hermeticity) | ○ | ◎ | X | X | X | X | ◎ | ◎ | Δ | ○ | ○ | Δ | ◎ | ◎ | ◎ |
| Rolling property | X | ○ | ○ | ○ | ○ | ○ | ○ | ○ | ○ | ○ | X | X | X | X | X |

Figure 5:
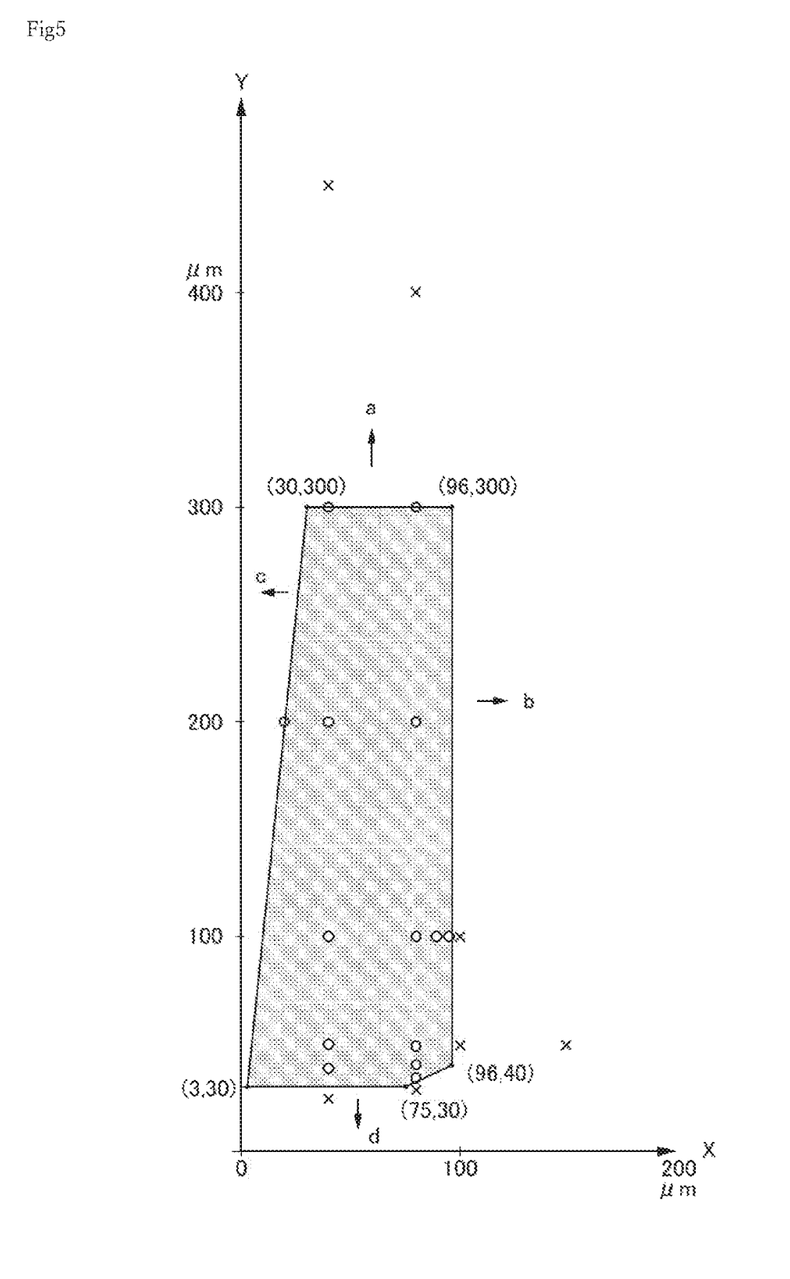
FIG. 5 is a plot diagram of the Examples and the Comparative Examples.

As shown in Tables 1 and 2, in the scope of the present invention, the bonding strength between the resin portion and the metal plate can be remarkably improved while suppressing the deformation. With regard to cases in which metal plates with a thickness of 400 μm were used, FIG. 5 indicates a range that satisfies each of the numerical definitions of claim 1 with hatched frame and plotted the Examples and Comparative Examples falling within the plate thickness of 400 μm.

EXPLANATION OF REFERENCE NUMERALS

Z Direction of ensuring hermeticity in the molded product for hermeticity test
W Hatching width
1 Groove formed on a metal plate with a laser
2 Test piece in which a metal plate is insert molded with a resin composition
3 Metal plate subjected to laser processing
4 Molded body comprising a resin composition=resin member
5 O-ring
6 Hermeticity tester lid
7 Hermeticity tester main body
8 Pressure
9 Line
10 Distilled water
E Hermeticity tester
a, c, d Area in which malfunction in bonding (hermeticity) occurs
b Area in which deformation occurs

The invention claimed is:

1. A method for producing a metal resin composite molded article, the method comprising insert molding a resin composition to a copper plate in a rolled shape having a thickness H of 450 μm or less,
   wherein the method comprises a step of forming on a surface of the copper plate a groove by laser scanning, to which the resin composition is inserted, and
   wherein an energy per unit area of the surface is 0.234-0.26 $J/mm^2$ and the surface is scanned a number of times sufficient to achieve a width Y of the groove of 35 to 300 μm, a depth X of the groove of 5-23.8% of the thickness H of the copper plate, and a ratio of the depth X to the width Y, X/Y, of 0.1 to 2.29.

* * * * *